Nov. 8, 1949  C. J. BISHOFBERGER  2,487,688
MOTOR
Filed March 19, 1945
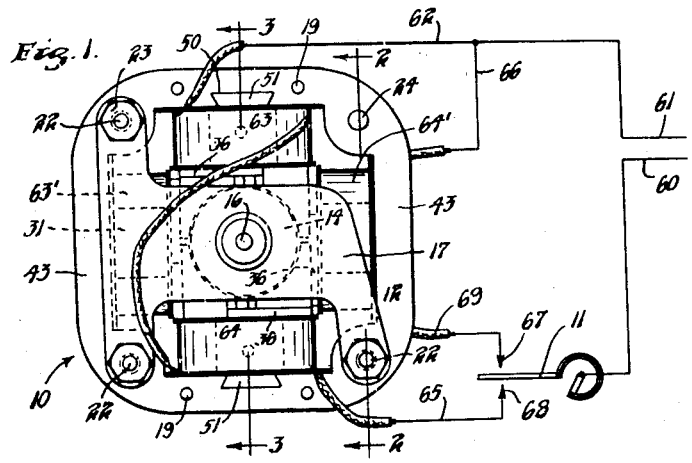
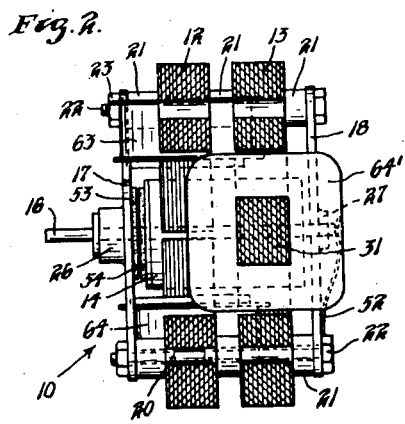
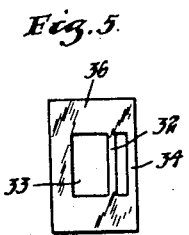
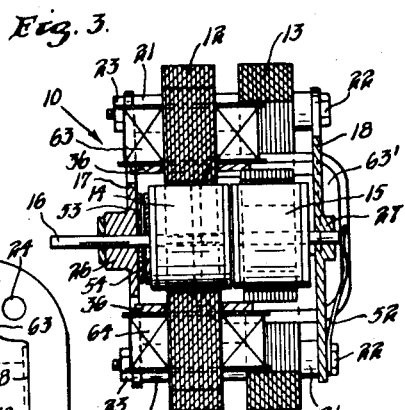
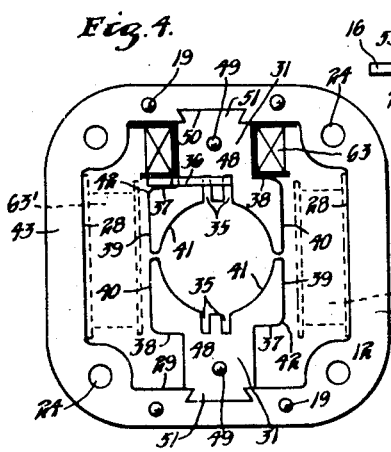
INVENTOR
CARL J. BISHOFBERGER
BY George H. Fisher
ATTORNEY Patented Nov. 8, 1949

2,487,688

UNITED STATES PATENT OFFICE 2,487,688

MOTOR

Carl J. Bishofberger, Minneapolis, Minn., assignor to Minneapolis-Honeywell Regulator Company, Minneapolis, Minn., a corporation of Delaware Application March 19, 1945, Serial No. 583,568

8 Claims. (Cl. 172—36)

My invention relates to improvements in electric motors, and more specifically to improvements in construction and arrangement of parts of a unit assembly of two motors which are mechanically and electrically disposed to provide reversible rotation of a common armature shaft.

Electric motors have been commercially made comprising two stators and two rotors in tandem relation for the purpose of providing for reversible rotation of a common armature shaft. However, in many instances, certain undesirable features inherent in tandem motors, such as expense, mechanical difficulties arising from the use of necessarily long armature shafts, along with bulkiness which prevents the use of such a motor in assemblies which are restricted to certain dimensional limitations, have usually given preference to more expensive types of reversible motors. For these reasons, tandem arrangements of unidirectional motors in a reversible motor structure have heretofore not attained popular usage.

In carrying out my invention, I provide in a motor structure a proportioning and arrangement of elements which overcomes the undesirable features hitherto encountered in similar motor constructions and provide a motor for reversible rotation which, by virtue of its compactness, readily lends itself to applications dictating space economy, is relatively efficient in operation, substantially free from service requirements, and which is of economical construction.

One of the features of my invention resides in the compactness of a structure which ordinarily comprises a bulky arrangement of two motor structures. This compactness arises from the novel manner in which I have proportioned and assembled the various parts of two independent motor stators to cooperate physically so that each stator economically uses a portion of the space which would ordinarily be wasted by its adjacent stator section. In this manner the interfitting of portions of each stator section serves to provide a secondary feature of rigidity for the entire structure which, along with the consequent shortening of the motor shaft, lessens the problem of bearing alignment and overcomes whipping and vibration inherent in long shaft arrangements which considerably shortens bearing and motor life.

In the particular embodiment of my invention disclosed, I have shown a motor of shaded pole induction type which, due to the absence of sliding contacts present in commutator type motors, supplements the feature of long life to bring forth an added feature of providing a motor which is substantially service-free throughout its life span.

Along with the advantageous mechanical features set forth, this motor, particularly the embodiment shown, adapts itself readily to simple control circuits inasmuch as reversible rotation is obtained by single-ended selective energization such as can readily be provided by a single pole double throw switching arrangement.

Accordingly, the objects of my invention are to provide a tandem motor structure of relative compactness which is economical to produce, rugged mechanically, efficient in operation, and substantially free from servicing attention.

These and other objects and features of my invention will become apparent from the accompanying drawings and description disclosing my invention.

In the accompanying drawings, forming a part of this specification, in which like numerals are employed to designate like parts throughout the same, Figure 1 is a front view of a preferred motor structure comprising my invention, Figure 2 is a section through the line 2—2 of Figure 1, Figure 3 is a section through the line 3—3 of Figure 1, Figure 4 is a partial view of Figure 1 showing the details of the stator structure, and Figure 5 is a detailed view of the shading coil comprising a part of the motor shown in the accompanying drawings.

Referring now to the drawings which exemplify a preferred form of my invention, reference numeral 10 generally designates a motor comprising stators 12 and 13 and rotors 14 and 15. The rotors shown are of a conventional squirrel cage type and are secured to a common shaft 16 which is rotatably mounted in bearings 26 and 27. The stators are of a somewhat conventional shaded pole type and will be described more fully hereinafter.

The stators and rotors are maintained in a desired relative position by means of a frame comprising face plates 17 and 18, sleeves 20, bushings 21, bolts 22, and nuts 23. Sleeves 20 cooperate with holes 24, drilled through the stators as shown to keep the stators in correct alignment and bushings 21 are employed to maintain the desired spacing between the stators and between the stators and their adjacent end plates. Bearings 26 and 27 comprise a portion of end plates 17 and 18 and consequently serve to maintain the desired clearance between the rotors and their respective stators.

Inasmuch as motors of the general type disclosed are widely used as prime movers for positioning valves, dampers, or the like, it may be desired that the rotor shaft be substantially free from coasting upon the deenergization of the motor subsequent to a period of energization. To this end, braking means comprising a friction member 53 secured to face plate 17 and a friction member 54 secured to rotor 14 is provided. The rotor assembly is axially shiftable and is biased in the direction of engagement of the friction members 53 and 54 by means of a spring 52, mounted on face plate 18, which bears on the shaft end. When the motor is deenergized, rotors 14 and 15 are urged by spring 52 out of alignment with their respective stator poles to the extent of engagement of friction members 53 and 54 and rotation of the shaft is prevented. Energization of either of the stators 12 or 13 will align its respective rotor against the force of spring 52 to disengage the friction members and allow free rotation of the shaft, and subsequent deenergization will again allow spring 52 to urge the rotors out of alignment and provide braking as described.

As is well known in motor art, the direction of rotation of a shaded pole induction motor is wholly dependent upon the position of the shaded portion of the pole with reference to the unshaded portion and is in the direction of the shaded portion. It is thus apparent that energization of stator 12 will rotate the output shaft in a counter-clockwise direction (see Fig. 5). Stator 13 is identical to stator 12. However, as shown in Figures 1 and 4, it has been rotated 180 degrees about its vertical axis relative to stator 12 consequently disposing its shading coils so that energization of stator 13 will produce a clockwise rotation of the output shaft.

Inasmuch as stators 12 and 13 are identical in construction, it will be sufficient to disclose the details of stator 12 alone to set forth the features in both. Stator 12 comprises a yoke 43 of symmetrical shape about a vertical and horizontal axes having pole assemblies 48 positioned thereon diametrically opposite each other.

Yoke 43 is formed of a plurality of stacked laminations which are maintained in stacked relation by means of rivets 19 and is provided with four holes 24 and dovetail notches 50. In the preferred form shown, holes 24 are so placed that the intersections of the line through each hole and its diagonal hole defines the center of rotation at the output shaft, so that the entire structure may be rotated in a manner placing each hole in a position formerly occupied by another hole without displacing the beforementioned intersection.

It is apparent that if such precaution is not taken to line up the stators axially, eccentricity may result thereby causing a rubbing stator rotor condition, inasmuch as the two stators 12 and 13 are displaced in profile, as shown in Figs. 2 and 3, so that their centers define the axes of rotation of the armature shaft.

Dovetail notches 50 are provided to accept dovetailed portions 51 of pole pieces 48 and are formed by stamping the pole piece laminations out of the same stock as the stator yoke in a conventional manner.

Pole pieces 48 are formed of stacked laminations which are held in place by rivets 49 and have placed thereon customary preformed windings 63 and 64 and shading coils 36. Reference numerals 63' and 64' are used to designate windings on stator 13 corresponding to those on stator 12 respectively designated as 63 and 64.

Each pole piece has a core portion 31, around which the preformed windings 63 and 64 are placed. The pole pieces 48 terminate in pole shoes comprising shoulders 37 and 38, sides 39 and 40, and pole faces 41 which are provided with slots 35 which accept members 32 and 34 of shading coil 36. Shoulder 37 is shorter than shoulder 38 by an amount equal to the thickness of shading coil 36 in order that when the shading coil is placed on the shoe, shoulder 38 and shoulder 37 plus shading coil 36 will form a platform substantially even with shoulder 38 to support the beforementioned preformed winding.

In assembly of the stator sections, the punched out portion 33 of shading coil 36 is first slipped over the corner 42 of the stacked pole lamination formed by sides 39 and 37 and then pressed into slots 35. As will be apparent from examination of the drawing, the width of the punched out portion 33 of shading ring 36 is slightly larger than the radial distance between corner 42 and pole face 41 in order to allow assembly as described. However, when the shading coil is pressed into place in slots 35, shoulder 37 extends sufficiently beyond slot 33 to maintain it non-rotatable in a counter-clockwise direction. The preformed winding 63 is then placed on the core portion and the dovetail portion of pole 48 is pressed into the dovetail notch 50 of the stator yoke. Shading coil 36 and pole shoe shoulder 40 will then serve to support winding 30 and also limit the dimension of winding 30 between the yoke and pole shoe while the winding 30 will in turn cooperate with shoulder 37 to maintain shading coil 36 in position.

The pole sides 39 and 40 cooperate to form surfaces which are parallel to the inside yoke surfaces 28 and are so dimensioned that the distance between the surface 39—40 and the surface 28 is at least as great as the distance between shoulder 38 and inside yoke surface 29. The purpose of proportioning the dimensions of the stator section in this manner will be brought out in the following description of the entire assembly.

In assembling the entire motor, two identical stator sections 12 and 13 are used. It may be assumed that stator 13 is originally in the same position as stator 12, in which case, for assembly, stator 13 is rotated 180 degrees about its vertical axis so that as viewed from the same end as stator 12, energization of stator 13 would produce a rotation of a rotor opposite in direction to that which stator 12 would produce. The stators are further shifted with respect to one another around the axis of the rotor to interfit the windings, this shift being set forth by the formula 180/N, where N is the number of pole pieces on one stator. The stator of each unit shown in the drawing is that of a unit pole machine or one with physically two pole pieces. Thus, further rotation of stator 13 ninety degrees about its longitudinal axis will adapt it for assembly with stator 12 in the manner shown.

As before noted, the various dimensions of the stator structure are such that each winding plus its shading coil thickness is just sufficient to allow interfitting between the corresponding inside yoke surface and pole side surface of the adjacent stators. The entire structure may be then assembled with portions of each winding interfitting a portion of its adjacent stator as shown, the proximity of stator 12 to stator 13 being determined by the length of bushing 21 therebetween.

It will be found that a minimum distance between stators 12 and 13, as determined by bushings 21 therebetween, will be required in order to avoid appreciable threading of the magnetic flux of one energized stator through the other unenergized stator. Interfitting of the stators 12 and 13 greatly enhances the rigidity of these stators relative to each other, and it has been found in actual practice that such interfitting may be carried out with savings up to 30% in the length of the entire structure as compared with the ordinary tandem arrangements without appreciable loss in efficiency. If, however, stators 12 and 13 are placed too close to each other, it will be apparent to those skilled in motor art that threading of the flux of one of the energized fields through portions of the other unenergized field will result in a general loss in efficiency. It is therefore imperative that interfitting of the stator structures be effected only to the extent that efficient operation of the unit is not impaired.

In exemplifying a preferred form of my invention, I have specified a shaded pole type of induction motor due to its simplicity of construction and reliability of operation. The reversible characteristic of this motor is provided by the orientation of one of the stator sections relative to the other. Therefore, a simple controlling circuit such as shown in Fig. 1 may be used to rotate shaft 16 in a forward or reverse direction as desired in its application.

To illustrate, I have shown a condition responsive element 11, in this case a thermoresponsive element, connected to conductor 60, comprising one side of a suitable source of power 60—61, and adapted to engage either contact 67 or 68 on a rise or fall in temperature. Windings 63 and 64 are connected in series as is common practice, one side being connected to conductor 61 through conductor 62 and the other side being connected to contact 68 through conductor 65. In a like manner, windings 63' and 64' are connected in series, one side being connected to line 61 through conductor 66, the other side being connected to contact 67 through conductor 69. In this manner, either that portion of the motor comprising windings 63 and 64 or that portion of the motor comprising windings 63' and 64' may be selectively energized to respectively rotate armature 14 or 15 in a clockwise or counter-clockwise direction to position some element of a temperature controlling system linked to armature shaft 16 in response to a signal from controller 11.

Although I have shown and described but one embodiment of my invention, it is to be understood that various departures may be made from the specific embodiments shown without departing from the spirit of the invention as set forth in the appended claims.

I claim as my invention:

1. In a dynamoelectric device, first and second stator sections mounted in tandem, said stator sections having a plurality of pole pieces and a plurality of windings each of which encircles one of said pole pieces the pole pieces of each stator with the windings thereon being equally spaced apart a distance greater than the width of a winding, said first stator section being angularly displaced with reference to said second stator section such that the windings on the first stator section interfit with the windings on the second stator section so that the over all length of said structure is less than the sum of the lengths of said two stator sections, when each has coils on its pole pieces.

2. In a dynamoelectric device, a shaft, a plurality of rotors electrically independent of one another mounted on said shaft, a plurality of stators each having pole pieces and having windings encircling said pole pieces, said stators being independently energizable to rotate said shaft in a clockwise or counter-clockwise direction, a frame maintaining said rotors and said stators in assembled relation, the pole pieces of each stator with the windings thereon being equally spaced apart a distance greater than the width of a winding, and the windings of said stators interfitting with one another in such a manner that the axial dimensions of the assembled stators is substantially less than the sum of the axial dimensions of each of said stators, when each has windings on its pole pieces.

3. In a dynamoelectric device, a shaft, a pair of rotors electrically independent of one another mounted on said shaft, a pair of stators each having a pair of pole pieces, a winding encircling each of the pole pieces of each of said stators, the pole pieces of each stator with the windings thereon being equally spaced apart a distance greater than the width of a winding, the extremity of one of said windings adjacent to the adjacent stator extending between the windings encircling the pole pieces of said adjacent stator when the latter has been shifted ninety degrees about the axis of rotation of the rotor and the stators have been assembled together.

4. In a dynamoelectric device, a shaft, a plurality of rotors electrically independent of one another mounted on said shaft, first and second stator sections of a shaded pole type, said stator sections being of identical construction and having pole pieces, said pole pieces having windings mounted thereon, the pole pieces of each stator with the windings thereon being equally spaced apart a distance greater than the width of a winding, said first stator section being positioned 180° about the vertical or horizontal axis with reference to the second stator section, said first stator section being rotated 180°/N about the axis of the rotors with reference to said second stator wherein N is the number of poles of one of said stator sections, said first stator section being mounted in tandem in this position with said second stator section disposed so that the windings on each of said pole pieces are disposed between the windings on the opposite stator section.

5. In a dynamoelectric device, a shaft, two rotors electrically independent of one another mounted on said shaft, two stators in tandem relation arranged to cooperate with said rotors, said stators comprising a core and two pole pieces, said pole pieces having shading coils mounted at each pole shoe extremity, said stators being identical in construction, one of said stators being rotated 180° about its vertical axis with respect to the remaining stator, said stator being in the aforesaid tandem relation and disposed to rotate said shaft in a clockwise or counterclockwise direction, each of said rotors being made of a laminated material and having a uniform thickness throughout its parts, the surfaces of the core and pole pieces of each of said stators defining a bounding plane of said stator, windings mounted on said pole pieces, said windings extending beyond the stator surfaces to add to the over all width of the stator, the pole pieces of each stator with the windings thereon being equally spaced apart a distance greater than the width of a winding, one of said stators being rotated ninety degrees about the rotational axis of the rotors with respect to the other stator, said stators being assembled in this position such that the coils on one stator interfit between the coils on the adjacent stator and extend into the nearest bounding plane of the adjacent stator.

6. In a dynamoelectric device, a shaft, a plurality of rotors electrically independent of one another mounted on said shaft, a plurality of stators in tandem relationship disposed to cooperate with said rotors to rotate said shaft in a counterclockwise or clockwise direction, said stators having pole pieces with windings encircling said pole pieces mounted thereon, the pole pieces of each stator with the winding thereon being equally spaced apart a distance sufficient to accommodate the maximum dimension of a winding, the windings of each stator interfitting between the windings on the adjacent stator and the stators being spaced apart a distance less than the radial dimension of a winding parallel to the axis of the rotors.

7. In a dynamoelectric device, a shaft, a plurality of rotors mounted on said shaft, a plurality of stators in tandem relationship disposed to cooperate with said rotors to rotate said shaft, said stators having pole pieces with the windings encircling said pole pieces mounted thereon, the pole pieces of each stator with the windings thereon being equally spaced apart a distance sufficient to accommodate the maximum dimension of a winding, the windings of each stator interfitting between the winding on the adjacent stator and the stators being spaced apart a distance less than the radial dimension of a winding parallel to the axis of the rotors.

8. In a dynamoelectric device, a shaft, a plurality of rotors electrically independent of one another mounted on said shaft, a plurality of stators each having a plurality of pole pieces to cooperate with said rotors, a plurality of windings mounted on and encircling the pole pieces of said stators, said pole pieces of each stator with said windings thereon being equally spaced apart a distance greater than the maximum dimension of a winding, each of said windings on one stator interfitting between the windings on the other stator and having a portion extending through the plane of the nearest lamination of the adjacent stator.

CARL J. BISHOFBERGER.

REFERENCES CITED

The following references are of record in the file of this patent:

UNITED STATES PATENTS

| Number | Name | Date |
|---|---|---|
| 433,701 | Tesla | Aug. 5, 1890 |
| 497,113 | Blathy | May 9, 1893 |
| 1,944,083 | Holland | Jan. 16, 1934 |
| 1,956,041 | Naul | Apr. 24, 1934 |
| 1,965,772 | Hanson | July 10, 1934 |
| 2,025,817 | Lanz | Dec. 31, 1935 |
| 2,157,752 | Freistadter | May 9, 1939 |
| 2,280,766 | Bronaugh | Apr. 21, 1942 |

FOREIGN PATENTS

| Number | Country | Date |
|---|---|---|
| 459,593 | Great Britain | Oct. 14, 1935 |